(12) United States Patent
Doland

(10) Patent No.: US 6,415,032 B1
(45) Date of Patent: Jul. 2, 2002

(54) ENCRYPTION TECHNIQUE USING STREAM CIPHER AND BLOCK CIPHER

(75) Inventor: Charles M. Doland, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/203,913

(22) Filed: Dec. 1, 1998

(51) Int. Cl.$^7$ .............................................. H04L 9/18
(52) U.S. Cl. ...................... 380/255; 380/37; 380/283; 380/28; 380/30
(58) Field of Search ...................... 380/255, 37, 283, 380/28, 30

(56) References Cited

U.S. PATENT DOCUMENTS

| | | | |
|---|---|---|---|
| 4,405,829 A | * 9/1983 | Rivest et al. | 178/22.1 |
| 5,369,708 A | * 11/1994 | Kawamura et al. | 380/30 |
| 5,623,549 A | * 4/1997 | Ritter | 380/37 |
| 6,002,769 A | * 12/1999 | McGough | 380/28 |
| 6,298,137 B1 | * 4/2000 | Hoffstein et al. | 380/30 |
| 6,081,597 A | * 6/2000 | Hoffstein et al. | 380/28 |

OTHER PUBLICATIONS

G. B. Agnew, R. C. Mullin, I. M. Onyszchuk, S. A. Vanstone; "An Implementation for a Fast Public–Key Cryptosystem"; Journal of Cryptology; vol. 3, No. 2; 1991; pp. 63–79.

Bruce Schneier; "Applied Cryptography"; 1996; Second Edition; published by John Wiley & Sons, Inc.; pp. 189–209, 261–263, 429431, 446–449, 455, 476–478.

Dorothy Elizabeth Robling Denning; "Cryptography and Data Security"; 1982; published by Addison–Wesley Publishing Company; pp. 100–109, 146–151, 160–161, 280–281.

* cited by examiner

*Primary Examiner*—Albert Decady
*Assistant Examiner*—Todd Jack
(74) *Attorney, Agent, or Firm*—Lois D. Cartier

(57) ABSTRACT

A method is provided for generating a pseudo-random sequence of integers, and the method is applied to the encryption of messages. The method uses a key K and a pair of prime numbers p and q, where q=2p+1. According to one aspect of the invention, a sequence of integers is formed. A sequence of bits is then formed from the sequence of integers, e.g., by selecting the least significant bit from each integer value. The sequence of bits is then used to encrypt a message using a selected encryption algorithm such as the XOR algorithm. Since prime numbers p and q can be selected to be larger than key K, the repeating period of the sequence of integers is larger than that permitted by the bit length of K.

29 Claims, 12 Drawing Sheets

$z(i)=y(i)$, if $y(i)<=p$; $z(i)=q-y(i)$, if $y(i)>p$

| i \ K | 2 | 3 | 4 | 5 | 6 | 7 | 8 | 9 | 10 | 11 |
|---|---|---|---|---|---|---|---|---|---|---|
| 0 | 1 | 1 | 1 | 1 | 1 | 1 | 1 | 1 | 1 | 1 |
| 1 | 2 | 3 | 4 | 5 | 6 | 7 | 8 | 9 | 10 | 11 |
| 2 | 4 | 9 | 7 | 2 | 10 | 3 | 5 | 11 | 8 | 6 |
| 3 | 8 | 4 | 5 | 10 | 9 | 2 | 6 | 7 | 11 | 3 |
| 4 | 7 | 11 | 3 | 4 | 8 | 9 | 2 | 6 | 5 | 10 |
| 5 | 9 | 10 | 11 | 3 | 2 | 6 | 7 | 8 | 4 | 5 |
| 6 | 5 | 7 | 2 | 8 | 11 | 4 | 10 | 3 | 6 | 9 |
| 7 | 10 | 2 | 8 | 6 | 3 | 5 | 11 | 4 | 9 | 7 |
| 8 | 3 | 6 | 9 | 7 | 5 | 11 | 4 | 10 | 2 | 8 |
| 9 | 6 | 5 | 10 | 11 | 7 | 8 | 9 | 2 | 3 | 4 |
| 10 | 11 | 8 | 6 | 9 | 4 | 10 | 3 | 5 | 7 | 2 |
| 11 | 1 | 1 | 1 | 1 | 1 | 1 | 1 | 1 | 1 | 1 |

FIG. 7

$b(i)$ = the least significant bit of $z(i)$ = $z(i)$ mod 2

| i \ K | 2 | 3 | 4 | 5 | 6 | 7 | 8 | 9 | 10 | 11 |
|---|---|---|---|---|---|---|---|---|---|---|
| 0 | 1 | 1 | 1 | 1 | 1 | 1 | 1 | 1 | 1 | 1 |
| 1 | 0 | 1 | 0 | 1 | 0 | 1 | 0 | 1 | 0 | 1 |
| 2 | 0 | 1 | 1 | 0 | 0 | 1 | 1 | 1 | 0 | 0 |
| 3 | 0 | 0 | 1 | 0 | 1 | 0 | 0 | 1 | 1 | 1 |
| 4 | 1 | 1 | 1 | 0 | 0 | 1 | 0 | 0 | 1 | 0 |
| 5 | 1 | 0 | 1 | 1 | 0 | 0 | 1 | 0 | 0 | 1 |
| 6 | 1 | 1 | 0 | 0 | 1 | 0 | 0 | 1 | 0 | 1 |
| 7 | 0 | 0 | 0 | 0 | 1 | 1 | 1 | 0 | 1 | 1 |
| 8 | 1 | 0 | 1 | 1 | 1 | 1 | 0 | 0 | 0 | 0 |
| 9 | 0 | 1 | 0 | 1 | 1 | 0 | 1 | 0 | 1 | 0 |
| 10 | 1 | 0 | 0 | 1 | 0 | 0 | 1 | 1 | 1 | 0 |
| 11 | 1 | 1 | 1 | 1 | 1 | 1 | 1 | 1 | 1 | 1 |

814  802  803  804  805  806  807  808  809  810  811

FIG. 8 use K=2 (permutation values = 0231)    900

| tries | bit position | bit pattern | sequence bits | value selected | values in the queue Q00, Q01, Q10, Q11 |
|---|---|---|---|---|---|
|   |    |    |    |    | 00,   01,   10,   11 |
| 1 | b0 | 00 | 00 | 00 | 01,   10,   11 |
| 2 | b1 | 01 | 01 | 10 | 01,   11 |
| 3 | b2 | 10 | 1  | 11 | 01 |
| 4 | b3 | 11 | -- | 01 | -- |

901  902  903  904  905  906

FIG. 9A use K=3 (permutation values = 3102)    910

| tries | bit position | bit pattern | sequence bits | value selected | values in the queue Q00, Q01, Q10, Q11 |
|---|---|---|---|---|---|
|   |    |    |    |    | 00,   01,   10,   11 |
| 1 | b0 | 00 | 11 | 11 | 00,   01,   10 |
| 2 | b1 | 01 | 01 | 01 | 00,   10 |
| 3 | b2 | 10 | 0  | 00 | 10 |
| 4 | b3 | 11 | -- | 10 | -- |

911  912  913  914  915  916

FIG. 9B use K=4 (permutation values = 1302) 920

| tries | bit position | bit pattern | sequence bits | value selected | values in the queue Q00, Q01, Q10, Q11 |
|---|---|---|---|---|---|
|   |   |   |   |   | 00, 01, 10, 11 |
| 1 | b0 | 00 | 01 | 01 | 00, 10, 11 |
| 2 | b1 | 01 | 11, 10 | 11 | 00, 10 |
| 3 | b2 | 10 | 0 | 00 | 10 |
| 4 | b3 | 11 | -- | 10 | -- |

921　922　923　924　925　926

FIG. 9C use K=5 (permutation values = 2031) 930

| tries | bit position | bit pattern | sequence bits | value selected | values in the queue Q00, Q01, Q10, Q11 |
|---|---|---|---|---|---|
|   |   |   |   |   | 00, 01, 10, 11 |
| 1 | b0 | 00 | 10 | 10 | 00, 01, 11 |
| 2 | b1 | 01 | 00 | 00 | 01, 11 |
| 3 | b2 | 10 | 1 | 11 | 01 |
| 4 | b3 | 11 | -- | 01 | -- |

931　932　933　934　935　936

FIG. 9D use K=6 (permutation values = 0312)    940

| tries | bit position | bit pattern | sequence bits | value selected | values in the queue Q00, Q01, Q10, Q11 |
|---|---|---|---|---|---|
|   |   |   |   |   | 00, 01, 10, 11 |
| 1 | b0 | 00 | 00 | 00 | 01, 10, 11 |
| 2 | b1 | 01 | 10 | 11 | 01, 10 |
| 3 | b2 | 10 | 0 | 01 | 10 |
| 4 | b3 | 11 | -- | 10 | -- |

941   942   943   944   945   946

FIG. 9E use K=7 (permutation values = 3102)    950

| tries | bit position | bit pattern | sequence bits | value selected | values in the queue Q00, Q01, Q10, Q11 |
|---|---|---|---|---|---|
|   |   |   |   |   | 00, 01, 10, 11 |
| 1 | b0 | 00 | 11 | 11 | 00, 01, 10 |
| 2 | b1 | 01 | 01 | 01 | 00, 10 |
| 3 | b2 | 10 | 0 | 00 | 10 |
| 4 | b3 | 11 | -- | 10 | -- |

951   952   953   954   955   956

FIG. 9F use K=8 (permutation values = 1032)                                960

| tries | bit position | bit pattern | sequence bits | value selected | values in the queue Q00, Q01, Q10, Q11 |
|---|---|---|---|---|---|
|   |   |   |   |   | 00,  01,  10,  11 |
| 1 | b0 | 00 | 01 | 01 | 00,       10,  11 |
| 2 | b1 | 01 | 00 | 00 |      10,  11 |
| 3 | b2 | 10 | 1  | 11 |      10 |
| 4 | b3 | 11 | -- | 10 | -- |

961  962  963  964  965  966

FIG. 9G use K=9 (permutation values = 3201)                                970

| tries | bit position | bit pattern | sequence bits | value selected | values in the queue Q00, Q01, Q10, Q11 |
|---|---|---|---|---|---|
|   |   |   |   |   | 00,  01,  10,  11 |
| 1 | b0 | 00 | 11 | 11 | 00,  01,  10 |
| 2 | b1 | 01 | 10 | 10 | 00,  01 |
| 3 | b2 | 10 | 0  | 00 | 01 |
| 4 | b3 | 11 | -- | 01 | -- |

971  972  973  974  975  976

FIG. 9H use K=10 (permutation values = 0132)                          980

| tries | bit position | bit pattern | sequence bits | value selected | values in the queue Q00, Q01, Q10, Q11 |
|---|---|---|---|---|---|
|   |    |    |       |    | 00,  01,  10,  11 |
| 1 | b0 | 00 | 00    | 00 | 01,  10,  11 |
| 2 | b1 | 01 | 11,00 | 01 | 10,  11 |
| 3 | b2 | 10 | 1     | 11 | 10 |
| 4 | b3 | 11 | --    | 10 | -- |

981  982  983  984  985  986

FIG. 9I use K=10 (permutation values = 2310)                          990

| tries | bit position | bit pattern | sequence bits | value selected | values in the queue Q00, Q01, Q10, Q11 |
|---|---|---|---|---|---|
|   |    |    |    |    | 00,  01,  10,  11 |
| 1 | b0 | 00 | 10 | 10 | 00,  01,  11 |
| 2 | b1 | 01 | 10 | 11 | 00,  01 |
| 3 | b2 | 10 | 1  | 01 | 00 |
| 4 | b3 | 11 | -- | 00 | -- |

ENCRYPTION TECHNIQUE USING STREAM CIPHER AND BLOCK CIPHER

CROSS-REFERENCE TO RELATED APPLICATIONS

This application relates to the following commonly assigned, concurrently filed U.S. patent application:

Ser. No. 09/203,236 invented by Charles M. Doland entitled "METHOD AND APPARATUS FOR DETECTING ALTERATIONS IN DATA MESSAGES", which is incorporated herein by reference.

FIELD OF THE INVENTION

The present invention relates generally to the field of message encryption and more particularly to the field of pseudo-random sequence generation for message encryption.

BACKGROUND OF THE INVENTION

A wide area network such as the Internet may connect thousands of network nodes, including routers, bridges, hubs, servers, and user terminals. In transmitting a message from a sender node to a receiver node over a wide area network, security is a great concern, because messages in transmission are susceptible to interception by unintended third parties at any network node. This problem is typically addressed by encrypting a private message at the sender node prior to transmission of the message, then decrypting the message at the receiver node. Encryption refers to a process of disguising a message sent from a sender node so that an unintended third party cannot recover the meaning of the message, even if the unintended third party has intercepted the message. Decryption refers to a process of recovering an encrypted message after an intended receiver node has received the encrypted message. For a receiver to recover an encrypted message received from a sender, the sender and the receiver must both agree on a predetermined encryption and decryption system.

An encryption and decryption system can be conveniently described using the following notations, where:

(1) a plain (not encrypted) message is denoted by P;

(2) an encryption transformation function is denoted by E;

(3) an encrypted message is denoted by C, where C=E(P);

(4) a decryption transformation is denoted by D; and (5) a decrypted message is also denoted by P, where P=D(E(P)).

Note that a decrypted message has the same notation as a plain message, because decrypting an encrypted message returns the original, unencrypted message.

To enhance security, most modern encryption systems use an encryption key, denoted by $K_e$, to encrypt messages prior to transmitting the messages, and a decryption key, denoted by $K_d$, to decrypt the messages upon receiving the messages. (The decryption key is often transmitted to the receiver node using a secure communication channel, to improve the security of the message, which can then be sent over an insecure channel.) In the available art, there are two general forms of key-based encryption and decryption systems: symmetric-key and public-key. In symmetric-key systems, the encryption key can be calculated from the decryption key and vice versa. Since in many such systems the encryption key $K_e$ and the decryption key $K_d$ are the same, the encryption key and the decryption key can be denoted by K.

Thus, a symmetric encryption and decryption system can be described using the following notations, where:

(6) a plain message is denoted by P;

(7) a symmetric key is denoted by K;

(8) an encryption transformation is denoted by $E_K$;

(9) an encrypted message is denoted by C, where $C=E_K(P)$;

(10) a decryption transformation is denoted by $D_K$; and

(11) a decrypted message is also denoted by P, where $P=D_K(E_K(P))$.

A simple exemplary symmetrical transformation between a sender and a receiver is the XOR logic operation. In this transformation, the plain message is "XORed" bit by bit with the key to generate an encrypted message. To regenerate the message at the receiver node, the encrypted message is once again XORed with the key. This series of operations reproduces the original message. Using the XOR logic operation, a symmetric-key encryption and decryption process can be described as follows:

$$E_K(x)=x\ XOR\ K; \quad (12)$$

$$D_K(x)=x\ XOR\ K; \quad (13)$$

$$C=E_K(P)=P\ XOR\ K; \quad (14)$$

and $$P=D_K(C)=C\ XOR\ K=(P\ XOR\ K)XOR\ K. \quad (15)$$

Symmetric encryption and decryption systems are divided into two categories: stream ciphers and block ciphers. A cipher refers to a mathematical function (such as XOR) used for encryption and decryption. In a stream cipher, a message is encrypted one bit at a time. In a block cipher, a message is encrypted a block at a time.

In real world applications, encrypted messages are subject to attack, a process of recovering the encrypted messages without being informed about the encryption algorithm or the encryption key. The security of an encryption system against attack typically depends on two elements: the strength of the encryption algorithm selected and the length of the key used.

Usually, a more secure encryption algorithm is more complicated than a less secure encryption algorithm. Consequently, greater expense and time are required to attack a more secure encryption algorithm. However, often more time and computing power are also required to perform the encryption and decryption using a more secure encryption algorithm. In some commercial settings, such costs are not necessary or feasible. By way of example, a consumer may use a desktop computer at home to conduct a real-time business transaction. The consumer's desktop computer may not have the computing power to perform a complicated encryption and decryption at such high speed. Further, if the amount of the business transaction is less than $1,000.00, an attacking cost above $1,000.00 will make the attack non-advantageous. As another example, some messages are only confidential for a short period of time, e.g., two months. A simple encryption algorithm is sufficient for such messages, if the attacking time takes more than two months. However, selecting a simple encryption algorithm leaves a user more vulnerable to attack than selecting a more complicated encryption algorithm.

The bit length of the key also affects the security of an encryption system. Any key-based encryption method is susceptible to a "brute force" attack. A brute force attack attempts to decrypt a message by applying the decryption function to the message, using each of the possible keys. To be secure against this type of attack, there must be a sufficient number of possible keys to make the attack too time-consuming to be useful. If a key is represented as a binary integer, the number of possible keys is $2^n$, where n is the number of bits in the key. Thus, in general, longer keys provide greater security against a brute force attack. For any given encryption method, there may be other methods of attacking or breaking the encryption, as well.

The choice between simple and complicated encryption algorithms presents a dilemma. While it is desirable to use simple encryption algorithms to suit some business transaction settings, selecting a simple encryption algorithm leaves an encrypted message vulnerable to attack. Similarly, increasing a key bit length increases the number of possible keys, thus enhancing the security of a encrypted message.

Therefore, there is a need to provide a method of encrypting messages adaptable to using a relatively simple encryption algorithm without compromising the security of encryption.

SUMMARY OF THE INVENTION

The present invention provides a novel method of generating a pseudo-random sequence of integers, and applies the method to the encryption of messages. The method uses a key K and a pair of prime numbers p and q, where q=2p+1. Specifically, a sequence of integers z(i), i=1, 2, ..., n, is generated as follows.

$$y(i)=K^i \bmod q \tag{16}$$

$$z(i)=y(i), \text{ if } y(i)\leq p \tag{17}$$

$$z(i)=q-y(i), \text{ if } y(i)>p \tag{18}$$

According to a first aspect of the invention, the sequence of integers is used to generate a stream cipher. Specifically, a sequence of integers z(i) is formed according to equations (16)–(18), where i=1, 2, ..., n. A sequence of bits b(i) is then formed from integers z(i), for example by selecting the least significant (or most significant) bit from each value z(i). The sequence of bits b(i) is then used to encrypt a message using a selected encryption algorithm such as the XOR algorithm. In another embodiment, the sequence of integers is used to encrypt the message without generating a sequence of b(i).

According to a second aspect of the invention, the pseudo-random sequence of integers is used to generate a block cipher. A sequence of bits b(i) is formed from integers z(i) as in the previously described embodiment. However, in this embodiment the sequence of bits b(i) is then used to encrypt a message by performing a bit position permutation on one or more message blocks.

According to a third aspect, the sequence of bits b(i) is used to encrypt a message by performing a bit pattern permutation on one or more message blocks.

According to a fourth aspect of the invention, a message block is divided into sub-blocks. The message block is encrypted by alternately applying a bit position permutation to the entire message block and applying a bit pattern permutation to each of the sub-blocks. In another embodiment, other (non-alternating) patterns of permutations are applied.

BRIEF DESCRIPTION OF THE DRAWINGS

The present invention is illustrated by way of example, and not by way of limitation, in the following figures, in which like reference numerals refer to similar elements.

FIGS. 6–8 illustrate a process of generating a pseudo-random string of bits to encrypt messages, in accordance with one embodiment of the invention.

FIGS. 9A–9J illustrate a process of generating permutation index values, in accordance with one embodiment of the invention.

DETAILED DESCRIPTION OF THE DRAWINGS

Figure 1:
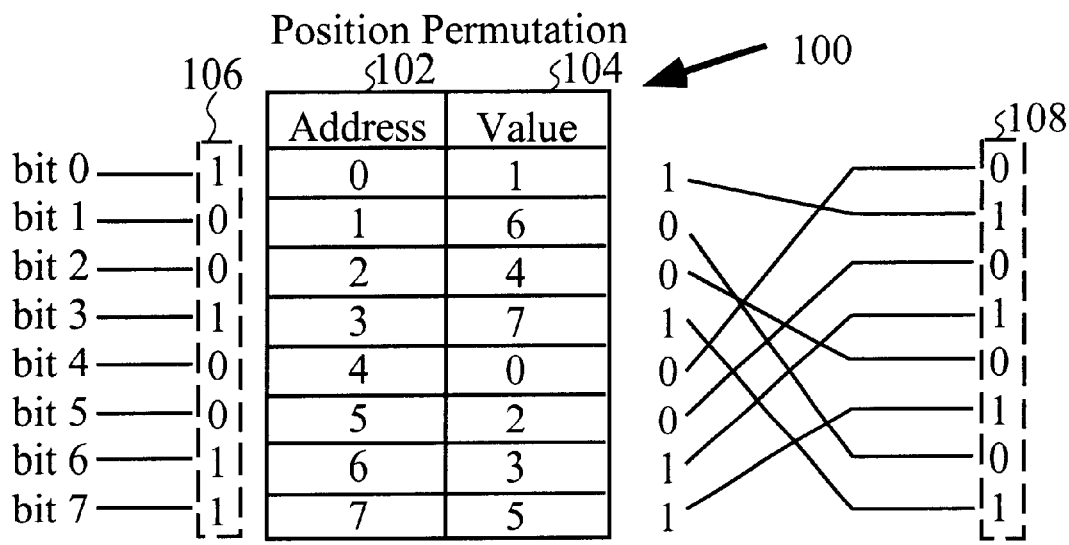
FIG. 1. illustrates a memory storing an array A and how it is used to perform a bit position permutation (i.e., a type 1 transformation), in accordance with one embodiment of the present invention.

The present invention provides a novel method for deriving a pseudo-random sequence of integers from a key K and a pair of prime numbers p and q, where q=2p+1, and applies the method to the encryption and decryption of messages. A sequence Z of n integers z(i), i=1, 2, ..., n, is created based on the following equations.

$$y(i)=K^i \bmod q \tag{19}$$

$$z(i)=y(i), \text{ if } y(i)\leq p \tag{20}$$

$$z(i)=q-y(i), \text{ if } y(i)>p \tag{21}$$

In the equations herein, a superscript represents exponentiation, and "mod" represents the modulus or remainder operation. The value z(i) is the ith integer in the sequence Z of values z(i).

Sequence Z is a sequence of integers that repeats with period T. Further, values z(i) are unique within any one period. Since the values of z(i) are distinct within a period, they provide outstanding material for reliable encryption. It should be appreciated that the repeating period T of sequence Z depends on the value of p, and not on the bit length of key K. Therefore, the present invention potentially provides (depending on the value of p) a selected encryption algorithm with a level of security significantly higher than current schemes based on key bit length.

The present invention provides two applications for the sequence of integers denoted by equations (19)–(21): a stream cipher and a symmetric block cipher. Exemplary embodiments are described for each type of cipher.

Stream Ciphers

A stream cipher is a symmetric encryption system in which a single key K is used to both encrypt and decrypt a message stream. Stream ciphers often use a key to generate a sequence of bits that is used to encrypt the message. For example, let P be the plain text of a message with n bits, where P(i) represents the $i^{th}$ bit of the message for i=1, 2, ..., n. Let $B_K$ be a sequence of bits generated by the encryption algorithm when key K is used, where $b_K(i)$ represents the $i^{th}$ bit in the sequence. (This sequence of bits $B_K$ is generated independently of the message. Therefore, the sequence of bits can be generated without the message; however, the key K is of course required.) C denotes the encrypted text of the message, where C(i) represents the $i^{th}$ bit in the encrypted message, and $C(i)=P(i)$ XOR $b_K(i)$. (XOR is the exclusive OR operation.)

A recipient of the encrypted message C can recover the plain text P of the message provided that he or she has the key K. First, the recipient generates the sequence of bits $B_K$ from the key K. Then, each plain text bit P(i) is generated as follows:

$$b_K(i) \text{ XOR } C(i) = b_K(i) \text{ XOR } (P(i) \text{ XOR } b_K(i)) \qquad (22)$$
$$= b_K(i) \text{ XOR } (b_K(i) \text{ XOR } P(i))$$
$$= (b_K(i) \text{ XOR } b_K(i)) \text{ XOR } P(i)$$
$$= 0 \text{ XOR } P(i)$$
$$= P(i)$$

The decryption transformation is identical to the encryption transformation. Therefore, the message can be decrypted by anyone, provided that he or she has the bit sequence that was used to encrypt the message. Typically, generating the sequence is straightforward if one has the key K, but it should be difficult to do so if one does not have the key K. Thus, for effective encryption, the sequence of bits should have no easily discernable pattern. Sequences with no easily discernable pattern are sometimes called "pseudo-random" bit sequences.

There are a number of known methods for generating pseudo-random sequences. Most such methods result in a sequence that repeats after some period T. If the repeat period T is short, then the security of the encryption is weak. For example, if the repeat period T is much shorter than the message, then there are many bits in the message that are encrypted using the same value of $b_K(i)$. If any one of these bits is decrypted, then all others of these bits may also be easily decrypted. The present invention uses a novel technique for generating a pseudo-random bit sequence having a long repeat period.

In the present invention, a key K is used to derive the sequence Z of z(i), where i=1, 2, ..., n, in accordance with equations (19)–(21). A pseudo-random sequence of bits b(i) is then formed by selecting a specific bit (e.g., the least significant bit or last bit) or several bits (e.g., the last several bits, or every other bit) from each integer z(i).

In the preferred stream cipher, a message containing a stream of bits P(i), where i=1, 2, ..., n, is encrypted one bit at a time. The message is encrypted, for example, by performing the XOR operation between corresponding bits of the message and the pseudo-random sequence of bits b(i). Using notations (6)–(11), encryption of the $i^{th}$ bit C(i) of the encrypted message C can be denoted as:

$$C(i)=P(i) \text{XOR } b(i) \qquad (23)$$

The message is decrypted by performing the XOR operation between corresponding bits of the encrypted message and the pseudo-random sequence of bits b(i). Decryption of the message can be denoted as:

$$P(i)=C(i) \text{XOR } b(i) \qquad (24)$$

Note that the encryption and decryption algorithms denoted by equations (23) and (24) are rather simple. As described in the background section of the present application, the level of security provided by known encryption systems depends on two elements: the strength of the encryption algorithm selected, and the bit length of the encryption key used. When the method of the invention is used, even though the encryption algorithm is rather simple and the bit length for the encryption key K is a fixed number, selection of a prime number p that is larger than the key bit length enhances the encryption security provided.

Improved Security for Stream Ciphers

In equations (19)–(21), note that y(1)=z(1)=K. Thus, if b(i) is the least significant bit of z(i), then b(1) is always equal to the least significant bit of K. This limitation is undesirable, because it allows one bit of K to be determined if only one bit (the first bit) of the plain text is discovered. To overcome this vulnerability, a constant offset value F can be added to the bit position in equation (23), as follows.

$$C(i)=P(i) \text{XOR } b(i+F) \qquad (25)$$

and the corresponding decryption of the message can be denoted as:

$$P(i)=C(i) \text{XOR } b(i+F) \qquad (26)$$

In further analyzing equations (19)–(21), it is noted that b(p)=1 for all keys K. Therefore, the message bit encrypted by bit b(p) is vulnerable to attack. To avoid this problem, the prime number p is preferably sufficiently large that for most or all messages, b(p) is not used to encrypt any bit of the message. If N denotes the largest anticipated message length in bits, then the last bit of the message is encrypted with bit b(N+F). Therefore, if p and F are chosen such that p>N+F (or, equivalently, p−F>N), this vulnerability is avoided.

Combining a Plurality of Stream Ciphers

To further enhance security, one embodiment of the present invention provides a plurality of stream ciphers. Each bit of the message is encrypted (and decrypted) by XORing the bit with each of the corresponding bits from each of the stream ciphers. To form m stream ciphers, a set of keys K(j) and two sets of prime numbers p(j) and q(j) are selected, where j=1, 2, ..., m and q(j)=2p(j)+1. Thus, a plurality of pseudo-random sequences of integers can be generated as follows.

$$y(i,j)=K(j)^i \mod q(j) \qquad (27)$$
$$z(i,j)=y(i,j), \text{ if } y(i,j) \leq p(j) \qquad (28)$$
$$z(i,j)=q(j)-y(i,j), \text{ if } y(i,j)>p(j) \qquad (29)$$

A plurality of pseudo-random sequences of bits b(i,j) is then formed by selecting one bit (e.g., the least significant bit), or several bits, from z(i,j).

Thus, in this embodiment the encryption of a message can be denoted as:

$$C(i)=P(i) \text{XOR } b(i,1) \text{XOR } b(i,2) \ldots \text{XOR } b(i,m) \qquad (30)$$

and corresponding decryption of the message can be denoted as:

$$P(i)=C(i) \text{XOR } b(i,1) \text{XOR } b(i,2) \ldots \text{XOR } b(i,m) \qquad (31)$$

It should be noted that y(1,j), z(1,j), b(1,j), and b(p,j) have similar vulnerabilities to those of y(1), z(1), b(1), and b(p), respectively. To overcome these vulnerabilities, in one embodiment of the invention a set of constant offset values F(j) is selected. Therefore, in this embodiment the encryption of a message can be denoted as:

$$C(i)=P(i) \text{XOR } b(i+F(1),1) \text{XOR } b(i+F(2),2) \ldots \text{XOR } b(i+F(m),m) \qquad (32)$$

and corresponding decryption of the message can be denoted as:

$$P(i)=C(i) XOR\ b(i+F(1),1) XOR\ b(i+F(2),2) \ldots XOR\ b(i+F(m),m) \quad (33)$$

For reasons similar to those discussed above in connection with constant offset value F, each F(j) is selected such that p(j)−F(j) is much larger than the length of most messages.

Symmetric Block Ciphers

A block cipher breaks a message into blocks and encrypts and decrypts the message blocks. In a symmetric block cipher, the message blocks are encrypted and decrypted using a single key K. Electronic book (ECB) mode is a simple symmetric block cipher mode well known to those skilled in the relevant art. In ECB mode, one plain message block is encrypted into only one encrypted cipher block and one encrypted cipher block corresponds to a plain message block. In other words, in ECB mode, each plain message block is encrypted independently from all other message blocks. Other block cipher modes exist and are well-known to those of ordinary skill in the relevant arts. In these other block cipher modes, the output block is dependent both on the input block and on previous blocks. The methods of the invention can be applied to these modes as well as to ECB modes.

Using notations (6)–(11), the encryption and decryption of a symmetric block cipher can be denoted, respectively, as:

$$C=E_K(P) \quad (34)$$

$$P=D_K(C) \quad (35)$$

In equations (34) and (35), C represents an encrypted message block, $E_K$ represents a transformation using key K, P represents a plain message block, and $D_K$ represents a reverse transformation of $E_K$ also using the key K.

The present invention performs a message block transformation by using one or both of two transformation types, referred to herein as type 1 and type 2 transformations. A type 1 transformation is a bit position permutation, and a type 2 transformation is a bit pattern permutation.

To efficiently perform both types of transformations using computer hardware and/or software, the present invention uses an array A of n values, with each of the elements in the array A being denoted as v(i), where i=0, . . . , n−1. The value of v(i) is also an integer in a range from 0 to n−1. Values within the array are used to "swap around" bits in a message block in a controlled and reproducible fashion (reproducible, that is, when the contents of the array are available). It should be noted that an array A represents a valid permutation if and only if: 1) the value of each array element v(i) is in a range from 0 to n−1, where i=1, . . . , n−1; and 2) the n values of all elements v(i) are distinct.

Bit position permutations and bit pattern permutations are now explained in detail, with examples.

Bit Position Permutations (Type 1 Transformations)

In performing a bit position permutation (i.e., a type 1 transformation), each bit in a message block is treated as an object. As is well known, a set of n objects (or n bit positions) can be arranged in n! permutations, where n! stands for n factorial (which is defined for non-negative integers as: 0!=1 and n!=n(n−1)! for n>0). For example, for a message of 3 bits, there are 3 bit positions and three bits p0, p1, p2. Therefore, there are 6 (3!, or 3×2×1) permutations for the three bits in the three bit positions: 1) p0, p1 p2; 2) p0 p2 p1; 3) p1 p0 p2; 4) p1 p2 p0; 5) p2 p0 p1; and 6) p2 p1 p0.

As a simple example of a bit position permutation, a message block of 3 bits is arranged in the initial order p0 p1 p2 and mapped into an array A having three elements a(0), a(1), a(2), respectively. The values of a(0)=1, a(1)=2, and a(2)=0 represent a permutation p1 p2 p0 for the 3 bits.

The inverse of a permutation can be easily constructed from the permutation. For example, if the permutation is represented as an array A of values a(i), wherein i=0, 1, . . . , n−1, as described above, then the inverse permutation can be represented as an array V of values v(i), where v(i)=j, and where j is a unique value such that a(j)=i. A single scan through the A array can determine all values of the V array. For example, if the 3 bits are permuted as: p0 p1 p2, and mapped into an array A having 3 elements a(0)=1, a(1)=2, a(2)=0, then v(0)=2, v(1)=0, and v(2)=1. Thus, the inverse process of the permutation can be performed by scanning and matching the three elements in array A with the three elements in array V: 1) v(0)=2, therefore a(2)=0; 2) v(1)=0, therefore a(0)=1; and 3) v(2)=1, therefore a(1)=2. As a result, the permutation p1 p2 p0 is inverted back to initial bit order p0, p1, p2.

Figure 2:
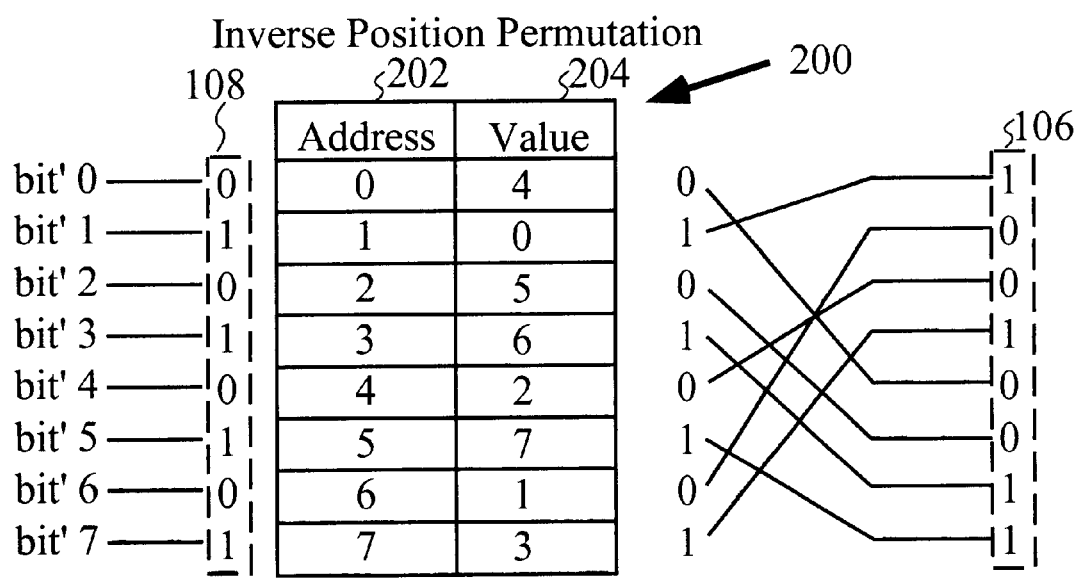
FIG. 2. illustrates a memory storing an array V and how it is used to perform an inversion of the bit position permutation shown in FIG. 1.

A slightly more complex example of two complimentary type 1 transformations (i.e., a permutation and its inverse) is shown in FIGS. 1–2. Transformations used in actual encryption and decryption may use much larger arrays than any of these examples.

FIG. 1 shows a memory 100 for storing an array A to perform a bit position permutation, in accordance with one embodiment of the present invention. Note that while FIG. 1 illustrates the bit position permutation for a message block of eight bits (since memory 100 contains eight logic memory cells), the inventive concept behind the example applies to a message block of any size.

As shown in FIG. 1, memory 100 includes an address column 102 having eight addresses (0, 1, 2, . . . , 7) for indicating eight array elements a(i), where i=0, 1, . . . , 7, and an index column 104 for storing eight index values (also 0, 1, 2, . . . , 7) for forming a bit position permutation of the eight array elements. Message block 106 has eight bits (bit0–bit7), and each of the eight bits is mapped to a respective address of memory 100 based on its position in the message block.

Specifically, as shown in FIG. 1, bits bit0–bit7 in message block 106 are mapped to addresses 0–7, respectively. The eight index values in index column 104 indicate a specific bit position permutation for the message block. For example, to find the new location for the first bit, bit0, look at address column 102, at address 0. The corresponding index value in column 104 is 1. Therefore, bit0 is placed at location 1 in the new (encrypted) message block 108. New locations can be determined for bits bit1–bit7 in a similar fashion. The result is encrypted message block 108, which comprises the following sequence of bits: bit4, bit0, bit5, bit6, bit2, bit7, bit1, bit3.

FIG. 2 shows a memory 200 for storing an array V to perform the inverse of the bit position permutation shown in FIG. 1, in accordance with the present invention.

As shown in FIG. 2, memory 200 includes an address column 202 having eight addresses (0, 1, 2, . . . , 7) for indicating eight array elements v(i), where i=0, 1, . . . , 7, and an inverse index column 204 for storing eight index values (also 0, 1, 2, . . . , 7) for forming an inverse permutation of the eight array elements. Encrypted message block 108 has 8 bits (bit'0–bit'7), and each of the 8 bits is mapped to a respective address of memory 200 based on its position in the encrypted message block.

Specifically, as shown in FIG. 2, bits bit'0–bit'7 in encrypted message block 108 are mapped to addresses 0–7, respectively. The eight index values in inverse index column 204 indicate a specific bit position permutation for the encrypted message block. For example, to find the new location for the first bit, bit'0, look at address column 202, at address 0. The corresponding inverse index value in column 204 is 4. Therefore, bit'0 is placed at location 4 in the new (decrypted or original) message block 106. New locations can be determined for bits bit'1–bit'7 in a similar fashion. As can be seen from FIG. 2, the array that performs an inverse permutation on array A=1, 6, 4, 7, 0, 2, 3, 5 is array V=4, 0, 5, 6, 2, 7, 1, 3.

Each of the eight values in inverse index column 204 indicates an address in memory 100 where the original bit position before the permutation is stored. Thus, by scanning memory 200 and memory 100, encrypted message block 108 can be transformed back to original message block 106.

Bit Pattern Permutations (Type 2 Transformations)

In performing a bit pattern permutation (i.e., a type 2 transformation), each bit pattern in a message block is treated as an object. A block of n bits can be arranged in $2^n$ bit patterns. For example, for a block of 3 bits, there are eight ($2^3$) possible bit patterns: 1) 000; 2) 001; 3) 010; 4) 011; 5) 100; 6) 101; 7) 110; and 8) 111.

A type 2 transformation can also be performed using array A and inverse array V.

Figure 3:
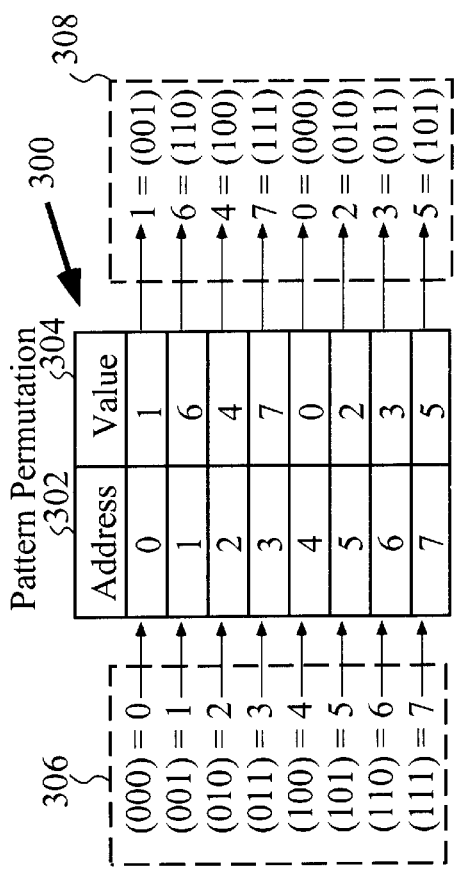
FIG. 3. illustrates a memory storing array A and how it is used to perform a bit pattern permutation (i.e., a type 2 transformation), in accordance with one embodiment of the present invention.

FIG. 3 shows a memory 300 for storing an array A to perform a bit pattern permutation, in accordance with one embodiment of the present invention. Note that while FIG. 3 illustrates the bit pattern permutation for a bit pattern of 3 bits (since memory 300 contains 8, or $2^3$, logic memory cells), the inventive concept behind the example applies to a message block of any size.

As shown in FIG. 3, memory 300 includes an address column 302 having eight addresses (0, 1, 2, . . . , 7) for indicating eight array elements a(i), where i=0, 1, . . . , 7, and an index column 304 for storing eight index values (also 0, 1, 2, . . . , 7) for forming a pattern permutation of the eight array elements. Each bit pattern in message block 306 contains three bits; therefore, there are a total of eight ($2^3$) possible patterns. Each of the eight bit patterns is mapped to a respective address based on the value of the bit pattern. (Note the difference from the position or type 1 permutation, wherein each bit is mapped to a respective address based on its position in the message block.)

Specifically, as shown in FIG. 3, the eight bit patterns (000, 001, . . . , 111) in original message block 306 are mapped to addresses 0–7, respectively. Index column 304 contains a permutation of the values from 0 to 7. Thus, each of the eight possible bit patterns is mapped into one of the eight values from 0–7, depending on the permutation indicated by the index column 304. For example, for the embodiment shown in FIG. 3, the eight possible bit patterns (000, 001, . . . , 111) of original message block 306 are mapped to the eight index values (1, 6, 4, 7, 0, 2, 3, 5), respectively. The index values are then represented as a bit pattern to generate encrypted message block 308. In the pictured embodiment, encrypted message block 308 comprises the following sequence of 3-bit patterns: 001, 110, 100, 111, 000, 010, 011, 101.

Figure 4:
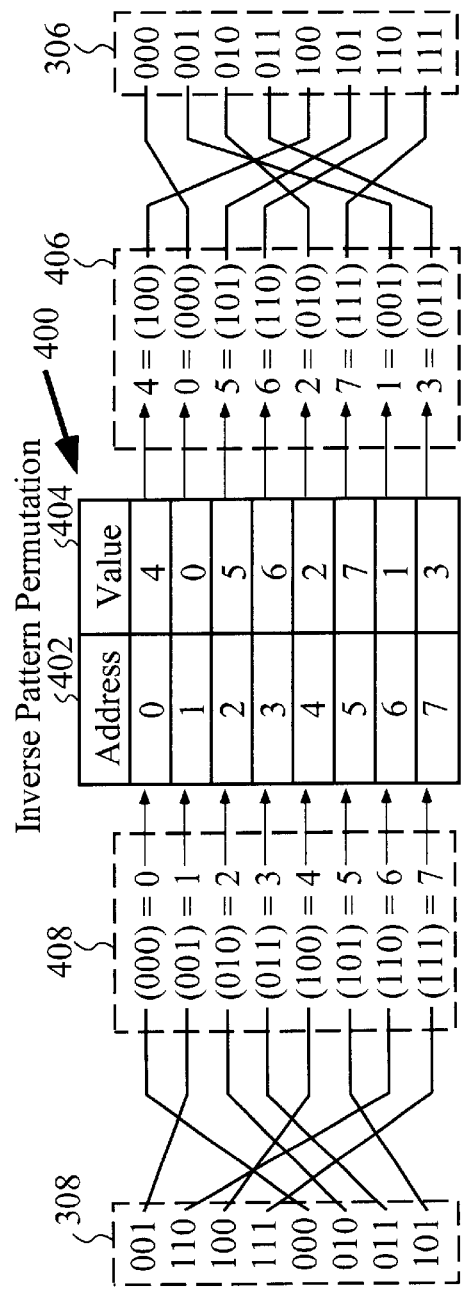
FIG. 4. illustrates a memory storing array V and how it is used to perform an inversion of the bit pattern permutation shown in FIG. 3.

FIG. 4 shows a memory 400 for storing an array V to perform the inverse of the bit pattern permutation shown in FIG. 3, in accordance with the present invention.

As shown in FIG. 4, memory 400 includes an address column 402 having eight addresses (0, 1, 2, . . . , 7) for indicating eight array elements v(i), where i=0, 1, . . . , 7, and an inverse index column 404 for storing eight values (also 0, 1, 2, . . . , 7) for forming an inverse pattern permutation of the eight array elements. Encrypted message block 308 contains eight transformed 3-bit patterns, and each of the eight patterns is mapped to a respective address based on the value of the bit pattern. (Because address mapping is based on the value of the bit pattern, and not on the position in the encrypted message block, encrypted message block 308 and encrypted message block 408 both correspond to the same message block, although they are represented differently in FIG. 4.)

Specifically, as shown in FIG. 4, the eight transformed bit patterns (001, 110, 100, 111, 000, 010, 011, 101) in encrypted message block 308/408 are mapped to addresses 1, 6, 4, 7, 0, 2, 3, 5, respectively. The eight index values in inverse index column 404 indicate a specific bit pattern permutation for the encrypted bit pattern. For example, to find the new bit pattern for the first encrypted bit pattern in encrypted message block 308, which is 001, look at address column 402, at address 1. The corresponding inverse index value in column 404 is 0. Therefore, encrypted bit pattern 001 is replaced by bit pattern 000 in the new (decrypted or original) message block 306. (Because index mapping is based on the value of the bit pattern, original message block 406 and original message block 306 both correspond to the same message block, although they are represented differently in FIG. 4.) New bit patterns can be determined for encrypted bit patterns 000 and 010–111 in a similar fashion. As can be seen from FIG. 4, the array that performs an inverse permutation on array A=1, 6, 4, 7, 0, 2, 3, 5 is array V=4, 0, 5, 6, 2, 7, 1, 3. Note that this inverse permutation array is the same array as in the type 1 transformation of FIG. 2.

Each of the eight values in inverse index column 404 indicates an address in memory 300 where the original bit pattern before the permutation is stored. Thus, by scanning memory 400 and memory 300, encrypted message block 308 can be transformed back to original message block 306.

"Subdividing" a Type 2 Transformation

To ensure a manageable value range, a type 2 transformation may further divide a message block of n bits into w sub-blocks of h bits each. A sub-block of h bits has $2^h$ bit patterns. A given one of the $2^h$ bit patterns can be transformed into any value in a range of 0 to $2^h-1$, depending on a permutation of the values of 0, 1, . . . , $2^h-1$.

Alternating Type 1 and Type 2 Transformations

To further enhance security, one embodiment of the present invention alternately applies type 1 and type 2 transformations for several passes, to encrypt a plain message block P of n bits. (Other embodiments apply type 1 and type 2 transformations in previously agreed patterns other than a simple alteration, thereby adding another level of security. In some embodiments, the type 2 transformations operate on sub-blocks of different sizes, adding yet another level of security.) Thus, transformation of a message block P of n bits can be denoted as:

$$C=G(P)=G[r](G[r-1] \ldots (G[i] \ldots (G[1](P)) \ldots ) \ldots ) \quad (36)$$

In equation (36), C is the encrypted message block; G is the overall transformation; G[i] is the $i^{th}$ transformation, where i=1, 2, . . . , r; G[i] is either a type 1 or type 2 transformation; and r is the number of transformations.

The original message block P can be recovered from the encrypted message block C using the inverse transformation of G, as follows:

$$P=G'(C)=G'[1](G'[2] \ldots (G'[i] \ldots (G'[r](C)) \ldots ) \ldots ) \quad (37)$$

In equation (37), G' is the inverse of the overall transformation G, G'[i] is the inverse of the $i^{th}$ transformation G[i], and r is the number of transformations.

To discuss the overall transformation G of equation (36) in further detail, it is assumed that there are m type 1 transformations and s type 2 transformations, where r=m+s. The m type 1 transformations and the s type 2 transformations are now separately described.

In performing m type 1 transformations in equation (36), the present invention uses m keys $K_1(j)$, $j=1, 2, \ldots, m$. Thus, each of the m type 1 transformations $T_1$ can be denoted as:

$$C=T_1[K_1(j)](B), j=1, 2, \ldots, m \qquad (38)$$

In equation (38), $T_1[K_1(j)]$ represents a type 1 permutation selected by the key $K_1(j)$, B represents the input block, and C represents the output block.

More specifically, for performing each of the m type 1 transformations, the present invention selects two sets of prime numbers $p_1(j)$ and $q_1(j)$, where $q_1(j)=2p_1(j)+1$, $j=1, 2, \ldots, m$. Using these prime numbers, a sequence of n integers can be derived as follows:

$$y_1(i,j)=K_1(j)^i \bmod q_1(j), \qquad (39)$$

where $j=1, 2, \ldots, m$ and $i=1, 2, \ldots, n$ $$z_1(i,j)=y_1(i,j), \text{ if } y_1(i,j) \leq p_1(j);$$

and $$z_1(i,j)=q_1(j)-y_1(i,j), \text{ if } y_1(i,j) > p_1(j) \qquad (40)$$

Once the sequence of integers $z_1(i,j)$ has been formed, a sequence of bits $b_1(i,j)$ can be formed by selecting a specific bit from $z_1(i,j)$. The sequence of integers $z_1(i,j)$ or the sequence of bits $b_1(i,j)$ can be used to select a bit position permutation for each of the m type 1 permutations. (The process of selecting a bit position permutation from a sequence of integers or bits is shown in FIGS. 9A–9J, which are later described.)

The inverse of the type 1 permutation (i.e., the transformation that returns the original message block B) can be denoted as follows:

$$B=T_1'[K_1(j)](C), j=1, 2, \ldots, m \qquad (41)$$

In equation (41), $T_1'[K_1(j)]$ represents an inverse of the first type 1 permutation $T_1$ selected by the key $K_1(j)$.

For performing s type 2 transformations in equation (36), the present invention uses s sets of keys $K_2$, each set of keys containing w sub-keys for performing a transformation for a sub-block (assuming that the block B is divided into w sub-blocks). Thus, the s key sets can be denoted as:

$$K_2(1,1), K_2(1,2), \ldots, K_2(1,w)$$
$$K_2(2,1), K_2(2,2), \ldots, K_2(2,w)$$
$$\ldots$$
$$K_2(s,1), K_2(s,2), \ldots, K_2(s,w) \qquad (42)$$

If input block B is divided into w sub-blocks B(j), where $j=1, 2, \ldots, w$, then a type 2 transformation $T_2$ can be denoted as:

$$C=T_2[K_2(i,1)](B(1)), T_2[K_2(i,2)](B(2)), \ldots, T_2[K_2(i,w)](B(w)),$$
$$\text{where } i=1, 2, \ldots, s=T_2[K_2(i,1), K_2(i,2), \ldots, K_2(i,w)](B) \qquad (43)$$

In equation (43), C represents the output block, and $T_2[K_2(i,j)]$ represents the type 2 transformation selected by the key $K_2(i,j)$.

More specifically, for performing each of the s type 2 transformations, the present invention selects two sets of prime numbers $p_2(i,j)$ and $q_2(i,j)$, where $q_2(i,j)=2p_2(i,j)+1$, $i=1, 2, \ldots, s$, and $j=1, 2, \ldots, w$. Hence, a sequence of integers can be denoted as:

$$y_2(i,j)=K_2(i,j)^i \bmod q_2(i,j), \text{ where } i=1, 2, \ldots, s \text{ and } j=1, 2, \ldots, w \qquad (44)$$

$$z_2(i,j)=y_2(i,j), \text{ if } y_2(i,j) \leq p_2(i,j);$$

and $$z_2(i,j)=q_2(i,j)-y_2(i,j), \text{ if } y_2(i,j) > p_2(i,j) \qquad (45)$$

Once the sequence of integers $z_2(i,j)$ has been formed, a sequence of bits $b_2(i,j)$ can be formed by selecting a specific bit from each of integers $z_2(i,j)$. The sequence of integers $z_2(i,j)$ or the sequence of bits $b_2(i,j)$ can be used to select a bit pattern permutation for each of s type 2 permutations.

The inverse of the type 2 transformation (i.e., the transformation that returns the original input block B) can be denoted as:

$$B=T_2'[K_2(i,1)](C(1)), T_2'[K_2(i,2)](C(2)), \ldots, T_2'[K_2(i,w)](C(w))=$$
$$T_2'[K_2(i,1), K_2(i,2), \ldots, K_2(i,w)](C) \qquad (46)$$

In equation (46), B represents the input block, C(i) represents the $i^{th}$ one of w sub-blocks of the output block, and $T_2'[K_2(i,j)]$ represents the type 2 inverse transformation.

The bit sequences used for the transformations need not all be separately generated. For example, in one embodiment, one $T_2$ transformation uses a single key K, with a single pair of prime numbers p and q, to generate a single sequence of bits. The bits from the sequence are then used for the w sub-block transformations in sequence; i.e., the single sequence of bits is divided into multiple "sub-sequences", each of which is used for a different sub-block. In other embodiments, sequences are divided in other ways among the various transformations.

Exemplary Encryption Process Using Alternating Transformations

Figure 5:
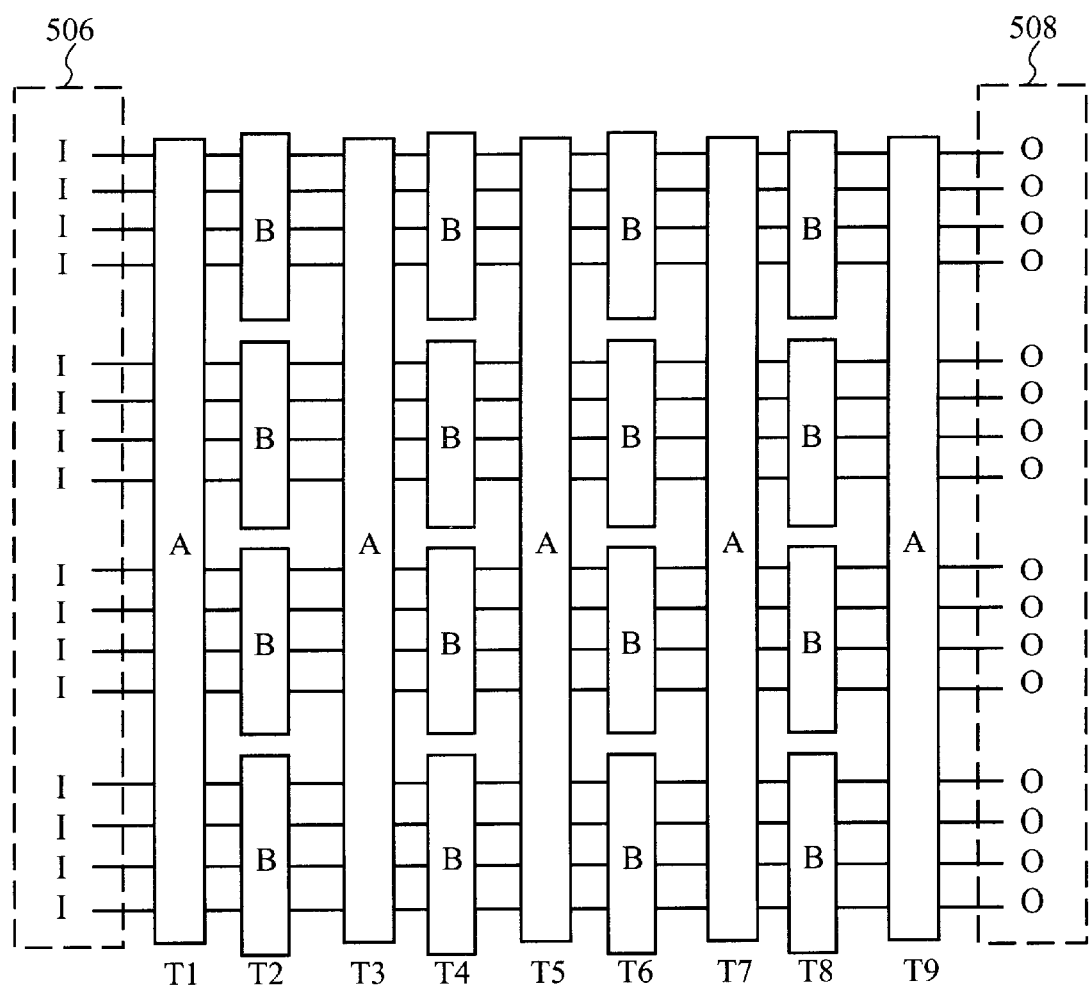
FIG. 5 illustrates an exemplary encryption process including alternate application of bit position and bit pattern permutations (type 1 and type 2 transformations), in accordance with one embodiment of the present invention.

FIG. 5 shows an exemplary encryption process wherein type 1 and type 2 transformations as denoted in equation (36) are alternately applied, in accordance with one embodiment of the present invention.

As shown in FIG. 5, nine transformations are performed over a message block 506 of 16 bits. Among these nine transformations, five are type 1 transformations (T1, T3, T5, T7, and T9) and four are type 2 transformations (T2, T4, T6, and T8). The sixteen lines labeled "I" represent the input bits of message block 506, and the sixteen lines labeled "O" represent the output bits of encrypted message block 508. Each rectangle labeled A represents a position permutation of 16 bits. Thus, the memory to store the index values for each position permutation requires 16 logic memory units, each containing four bits indicating one of the 16 possible bit positions. Likewise, the memory to store the inverse index values to each position permutation also requires 16 logic memory units, each containing four bits.

In performing type 2 transformations, the message block of 16 bits is divided into four sub-blocks of four bits. In FIG. 5, each rectangle labeled B represents a pattern permutation of four bits. Thus, the memory to store the index values for each 4-bit pattern permutation requires 16 logic memory units, each containing four bits indicating one of the 16 values from 0 to 15. Likewise, the memory to store the inverse index to each 4-bit pattern permutation requires 16 logic memory units, each containing four bits.

The embodiment of FIG. 5 uses the five sets of type 1 keys $K_1(1)$, $K_1(2)$, $K_1(3)$, $K_1(4)$, and $K_1(5)$ to perform the type 1 transformations T1, T3, T5, T7, and T9, respectively.

In performing the type 2 transformations T2, T4, T6, and T8, the embodiment of FIG. 5 uses four sets of keys $K_2(1,j)$, $K_2(2,j)$, $K_2(3,j)$, and $K_2(4,j)$, where j=1, 2, 3, 4. Each of the four sets of keys contains four sub-keys to perform the type 2 transformations for the four sub-blocks. Thus, the four sets of keys can be denoted as follows:

$K_2(1,1), K_2(1,2), K_2(1,3), K_2(1,4)$ for T2

$K_2(2,1), K_2(2,2), K_2(2,3), K_2(2,4)$ for T4

$K_2(3,1), K_2(3,2), K_2(3,3), K_2(3,4)$ for T6

$K_2(4,1), K_2(4,2), K_2(4,3), K_2(4,4)$ for T8 (47)

To enhance encryption security, the embodiment of FIG. 5 forms pseudo-random sequences of bits using the five type 1 keys and the four sets of type 2 keys. The pseudo-random sequences of bits are then used to generate index values to initialize the index columns of the memory, similar to the index columns 104, 304 of memories 100, 300, shown in FIGS. 1 and 3.

Generating a Sequence of Bits

Figure 6:
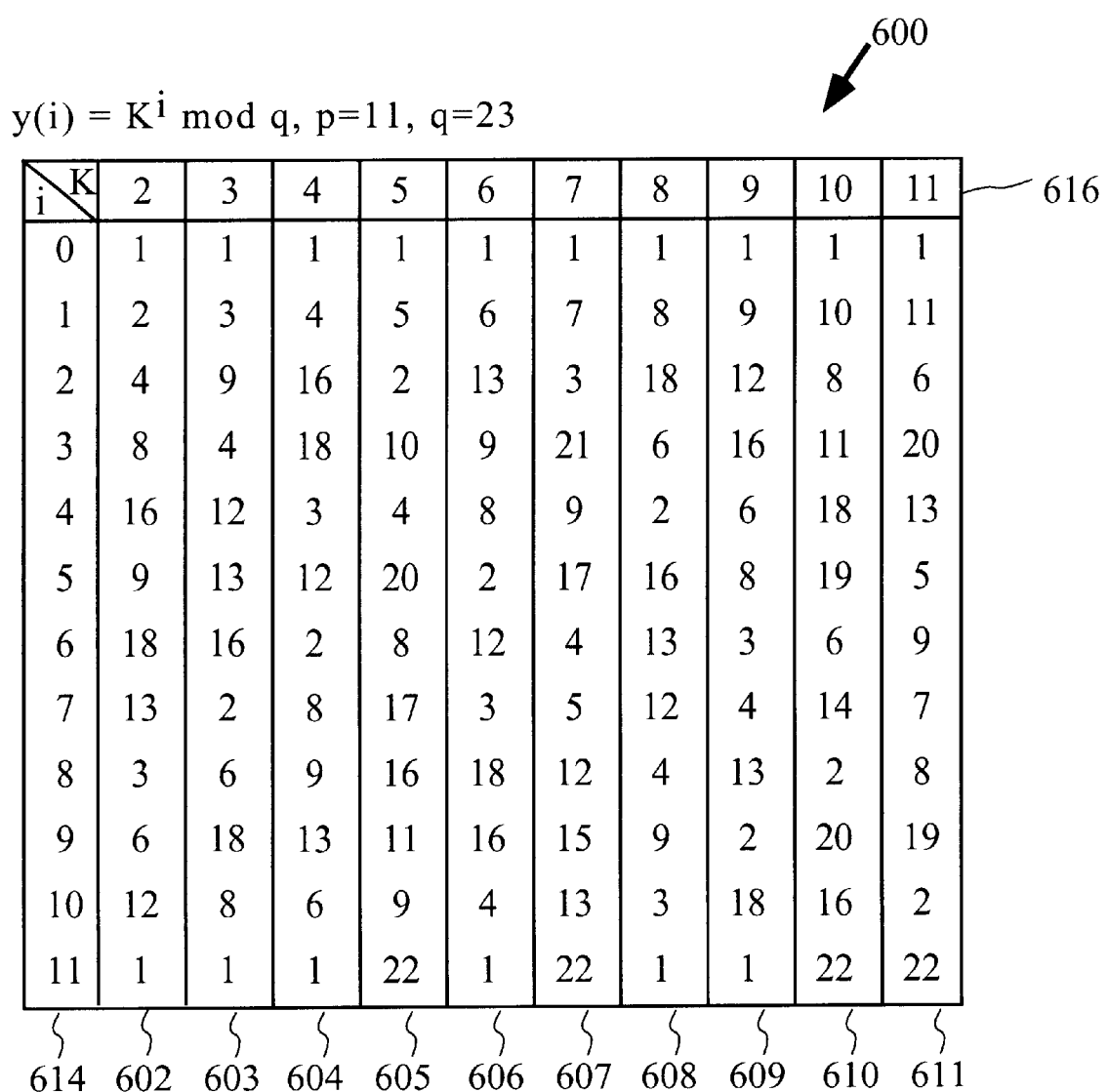

FIGS. 6–8 show a process of generating a pseudo-random sequence of bits derived in accordance with equations (19)–(21), in which the prime numbers p and q are specifically selected as 11 and 23, respectively.

FIG. 6 shows a table 600 containing ten sequences of y(i) (shown in vertical columns) corresponding to ten different keys. Row 616 contains ten keys 2 to 11, and column 614 indicates twelve consecutive bit positions i, where i=0, 1, . . . , 11. Columns 602–611 contain the values for the ten sequences of y(i) corresponding to the keys 2 to 11, respectively.

FIG. 7 shows a table 700 containing ten sequences of z(i) corresponding to the ten sequences of y(i) shown in FIG. 6. Row 716 contains ten different keys 2 to 11, and column 714 indicates twelve consecutive bit positions i, where i=0, 1, . . . , 11. Columns 702–711 contain the values for the sequences of z(i) corresponding to the y(i) shown in FIG. 6, respectively, and keys 2 to 11, respectively.

FIG. 8 shows a table 800 containing ten pseudo-random sequences of bits b(i) corresponding to the ten sequences of z(i) shown in FIG. 7. Row 816 contains ten different keys 2 to 11, and column 814 indicates twelve consecutive bit positions i, where i=0, 1, . . . , 11. Columns 802–811 contain the ten pseudo-random sequences of bits corresponding to the z(i) shown in FIG. 7, respectively, and keys 2 to 11, respectively.

In FIG. 8, each of the ten pseudo-random sequences of bits is formed by selecting the least significant bit from z(i). For example, as shown in column 702 in FIG. 7, when K=2, the sequence of z(i) has twelve values: 1, 2, 4, 8, 7, 9, 5, 10, 3, 6, 11, and 1. The repeat period T for this sequence is 11; therefore z(i) has 11 distinct values. For example, the value "1" from position z(0) is repeated at position z(11). The binary representation of the twelve values in column 702 is: 0001; 0010; 0100; 1000; 0111; 1001; 0101; 1010; 0011; 0110; 1011; and 0001. The pseudo-random sequence (100011101011) shown in column 802 is formed by selecting the least significant bit from the binary representation of sequence z(i). The other nine pseudo-random sequences of bits (for K=3 to K=11) are formed using the same principle.

Generating Permutation Index Values from the Sequence of Bits

Referring to FIGS. 9A–J, a process (including 10 schemes) of generating permutation index values is shown for the type 1 and type 2 transformations using the pseudo-random sequences shown in FIG. 8, in accordance with the present invention.

In describing the examples shown in FIGS. 9A–9J, it is assumed that the type 1 transformation performs the bit position transformation over a message block of four bits. Thus, a memory of four logic memory units is able to store all possible bit permutation index values for the type 1 transformation. The type 2 transformation in this embodiment performs the bit pattern transformation over a message block of two bits. Thus, a memory of four logic memory units is able to store all possible bit pattern permutation index values for the type 2 transformation, because two bits can have four different bit patterns (00, 01, 10, and 11). Further, as shown in FIG. 8, b(0) is always 1 regardless of the value of key K. To enhance security, the process of FIGS. 9A–9J skips the b(0) bit in selecting bits from the sequence b(i).

Referring to FIG. 9A, a scheme 900 is shown using the pseudo-random sequence in column 802 of FIG. 8 (K=2) to generate permutation index values for type 1 and type 2 transformations, in accordance with the present invention.

As shown in FIG. 9A, column 902 contains four bit positions (b0, b1, b2, b3) for a message block of four bits, and column 903 contains four bit patterns (00, 01, 10, 11) for a message block of two bits. Column 906 contains combinations of four values (00, 01, 10, 11) for forming a permutation for the four bit positions in column 902 (if doing a type 1 transformation), or for the four bit patterns in column 903 (if doing a type 2 transformation). The four values (00, 01, 10, 11) in column 906 are stored in a quasi queue (quasi-Q) having four positions (Q00, Q01, Q10, Q11). Q00 is the head of the quasi-Q, and Q11 is the tail of the quasi-Q. The values stored at any of the four positions in the quasi-Q can be selected. However, after one value has been selected from the quasi-Q, all remaining values are sequentially moved from the tail to the head. Column 905 indicates a permutation obtained by selecting the four values stored in the quasi-Q, based on the values of the bits in column 904. Column 904 contains the bits sequentially selected from the pseudo-random sequence stored in column 802 of FIG. 8. Column 901 indicates the number of tries to select the values from the quasi-Q.

In try 1, scheme 900 selects two bits (bit 1 and bit 2) from column 802 of FIG. 8. (Since bit 0 is always 1 regardless of key K, scheme 900 skips bit 0.) As shown in column 904, bits 1 and 2 are 00, indicating position Q01 in the quasi-Q. As shown in column 905, the value 00 stored in Q00 is selected. As shown in column 906, after value 00 has been selected, the three values left (01, 10, 11) in the quasi-Q are shifted into positions Q00, Q01 and Q10, respectively.

In try 2, scheme 900 selects the next two bits (bit 3 and bit 4) from column 802 of FIG. 8. As shown in column 904, bits 3 and 4 are 01, indicating position Q01 in the quasi-Q. As shown in column 905, the value 10 stored in position Q01 is selected. As shown in column 906, after the value 10 has been selected, the value in Q10 is shifted into position Q01.

In try 3, scheme 900 selects the next single bit (bit 5) from column 802 of FIG. 8. Since only two values are left in the quasi-Q, one bit is sufficient to select between these two values; therefore, only one bit is selected. (In another embodiment, two bits are always selected regardless of the minimum number of bits required.) As shown in column 904, bit number 5 is 1, indicating position Q01 in the quasi-Q. As shown in column 905, the value 11 stored in position Q01 is selected. As shown in column 906, the one value left (01) in the quasi-Q remains in position Q01.

In try 4, since only one value is left in the quasi-Q, scheme 900 simply selects the value stored in position Q00. As shown in column 905, a permutation (00, 10, 11, 01; or 0231) is formed.

Referring to FIG. 9B, a scheme 910 of using the pseudo-random sequence in column 803 of FIG. 8 (K=3) is shown to generate permutation index values for type 1 and type 2 transformations, in accordance with the present invention. The steps generating the permutation index values for FIG. 9B are similar to those described above in connection with FIG. 9A.

Referring to FIG. 9C, a scheme 920 is shown for using the pseudo-random sequence in column 804 of FIG. 8 (K=4) to generate permutation index values for type 1 and type 2 transformations, in accordance with the present invention. In FIG. 9C, the functions of columns 921–926 are the same as those of columns 901–906, respectively.

In try 1, scheme 920 selects two bits (bit 1 and bit 2) from column 804 of FIG. 8. (Since bit 0 is always 1, regardless of the key K, scheme 920 skips bit 0.) As shown in column 924, bits 1 and 2 are 01, indicating position Q01 in the quasi-Q. As shown in column 925, the value 01 stored in Q01 is selected. As shown in column 926, the values 10 and 11 in the quasi-Q are shifted to positions Q01 and Q10, respectively. Consequently, three values (00, 10, 11) remain in the quasi-Q at positions Q00, Q01 and Q10, respectively.

In try 2, scheme 920 selects the next two bits (bit 3 and bit 4) from column 804 of FIG. 8. As shown in column 924, bits 3 and 4 are 11, indicating position Q11 in the quasi-Q. Since position Q11 is now empty, scheme 920 further selects the next two bits (bit 5 and bit 6). As shown in column 924, bits 5 and 6 are 10, indicating position Q10 in the quasi-Q. As shown in column 925, the value 11 stored in position Q10 is selected. As shown in column 926, values 00 and 10 remain in the quasi-Q at positions Q00 and Q01, respectively.

In try 3, scheme 920 selects the next single bit (bit 7) from column 804 of FIG. 8. (Since only two values are left in the quasi-Q, one bit is sufficient to select between these two values.) As shown in column 924, bit 7 is 0, indicating position Q00 in the quasi-Q. As shown in column 925, the value 00 stored in position Q00 is selected. As shown in column 926, after the value 01 has been selected, the value 10 previously stored in position Q01 is shifted into position Q00.

In try 4, since only one value is left in the guasi-Q, scheme 920 simply selects the value stored in position Q00. As shown in column 905, a permutation (01, 11, 00, 10; or 1302) is formed.

The steps for generating the permutation index values for FIGS. 9D–9J are similar to those described above in connection with FIGS. 9A and 9C.

Referring to FIG. 9D, a scheme 930 of using the pseudo-random sequence in column 805 of FIG. 8 (K=5) is shown to generate permutation index values for type 1 and type 2 transformations, in accordance with the present invention.

Referring to FIG. 9E, a scheme 940 of using the pseudo-random sequence in column 806 of FIG. 8 (K=6) is shown to generate permutation index values for type 1 and type 2 transformations, in accordance with the present invention.

Referring to FIG. 9F, a scheme 950 of using the pseudo-random sequence in column 807 of FIG. 8 (K=7) is shown to generate permutation index values for type 1 and type 2 transformations, in accordance with the present invention.

Referring to FIG. 9G, a scheme 960 of using the pseudo-random sequence in column 808 of FIG. 8. (K=8) is shown to generate permutation index values for type 1 and type 2 transformations, in accordance with the present invention.

Referring to FIG. 9H, a scheme 970 of using the pseudo-random sequence in column 809 of FIG. 8 (K=9) is shown to generate permutation index values for type 1 and type 2 transformations, in accordance with the present invention.

Referring to FIG. 9I, a scheme 980 of using the pseudo-random sequence in column 810 of FIG. 8 (K=10) is shown to generate permutation index values for type 1 and type 2 transformations, in accordance with the present invention.

Referring to FIG. 9J, a scheme 990 of using the pseudo-random sequence in column 811 of FIG. 8. (K=11) is shown to generate permutation index values for type 1 and type 2 transformations, in accordance with the present invention.

The process depicted in FIGS. 9A–J generates ten permutation index values as listed in Table 1.

TABLE 1

| | |
|---|---|
| (0231):K | = 2 |
| (3102):K | = 3 |
| (1302):K | = 4 |
| (2031):K | = 5 |
| (0312):K | = 6 |
| (3102):K | = 7 |
| (1032):K | = 8 |
| (3201):K | = 9 |
| (0132):K | = 10 |
| (2310):K | = 11 |

Among the ten permutations, two are duplicates (K=3 and K=7, which generate the same permutation index value 3102). The ten permutations can be used to initialize a permutation index memory similar to memories 100 and 300 of FIGS. 1 and 3.

Flow Chart for Message Encryption

Figure 10:
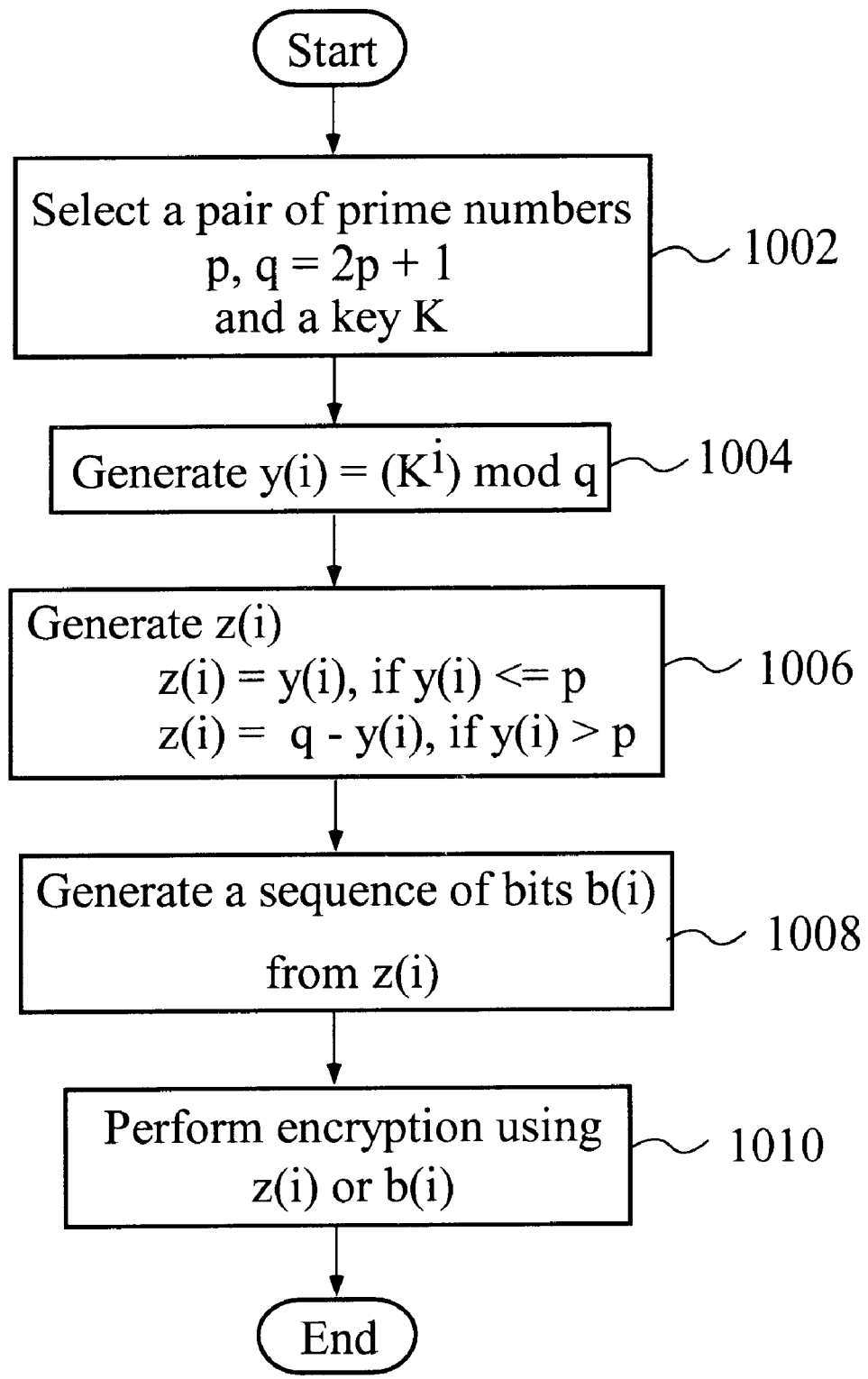
FIG. 10 is a flowchart illustrating the steps of encrypting a message or message block, in accordance with one embodiment of the invention.

FIG. 10 shows the steps of encrypting a message or message block in accordance with one embodiment of the present invention. At step 1002, a pair of prime numbers p and q=2p+1 and a key K are selected. At step 1004, a sequence of integers $y(i)=K^i \mod q$ is generated. At step 1006, a sequence of integers $z(i)$ is generated, where $z(i)=y(i)$ if $y(i) \leq p$, and $z(i)=q-y(i)$ if $y(i)>p$. At step 1008, the system generates a sequence of bits $b(i)$ by selecting a bit from $z(i)$. At step 1010, the system encrypts a message or a message block using either $z(i)$ or $b(i)$. As described above, the sequences $z(i)$ and $b(i)$ are utilized to generate stream ciphers and/or block ciphers.

The encryption and decryption schemes of the present invention can be performed on a computer system such as are well known in the relevant art. Note, however, that the method of the invention can be performed without such a computer system, e.g., in dedicated hardware such as an integrated circuit or circuit board designed specifically for this purpose.

The present invention therefore provides a novel method for generating a pseudo-random sequence and implementing an encryption and decryption scheme based on the sequence. Although the present invention has been shown and described with respect to preferred embodiments, various changes and modifications lie within the spirit and scope of the claimed invention. Accordingly, all such modifications and additions are deemed to be within the scope of the invention, which is to be limited only by the appended claims and their equivalents.

What is claimed is:

1. A method for encrypting a message of n bits using a pseudo-random sequence, the method comprising:

selecting a first prime number p and a second prime number q, where q=2p+1;

selecting a key K;

generating a sequence of integers $y(i)$, where $y(i)=K^i \mod q$, i=1, 2, . . . , n;

generating a sequence of integers $z(i)$, where $z(i)=y(i)$ if $y(i) \leq p$, and $z(i)=q-y(i)$ if $y(i)>p$; and encrypting the message using the sequence of integers z(i).

2. The method of claim 1, wherein:
the message contains a sequence of bits P(i), where i=1, 2, . . . , n; and
the encrypted message comprises a sequence of bits C(i), where C(i)=P(i) XOR z(i).

3. The method of claim 2, further comprising:
decrypting the sequence of bits C(i) by performing the transformation P(i)=C(i) XOR z(i).

4. The method of claim 1, wherein:
the message contains a sequence of bits P(i), where i=1, 2, . . . , n;
F is a constant offset value; and
the encrypted message comprises a sequence of bits C(i), where C(i)=P(i) XOR z(i+F).

5. The method of claim 4, further comprising:
decrypting the sequence of bits C(i) by performing the transformation P(i)=C(i) XOR z(i+F).

6. The method of claim 4, wherein the constant offset value F chosen such that p>n+F.

7. The method of claim 1, further comprising selecting a bit position permutation based on the sequence of integers z(i), and wherein:
the message contains a message block of h bits having h bit positions; and
the step of encrypting the message comprises performing the selected bit position permutation on the message block.

8. The method of claim 1, further comprising selecting a bit pattern permutation based on the sequence of integers z(i), and wherein:
the message contains a message block of h bits, the h bits being arranged as a bit pattern; and
the step of encrypting the message comprises performing the selected bit pattern permutation on the message block.

9. The method of claim 1, further comprising:
selecting a bit position permutation based on the sequence of integers z(i); and
selecting a bit pattern permutation based on the sequence of integers z(i);
and wherein:
the message contains a message block of u bits having u bit positions;
the message block is divided into w sub-blocks, each containing h bits forming a bit pattern; and
the step of encrypting the message is performed in a plurality of transformations comprising:
applying a bit position permutation over the message block of u bits based on the selected bit position permutation; and
applying a bit pattern permutation over at least one of the w sub-blocks of h bits, based on the selected bit pattern permutation.

10. A method for encrypting a message of n bits using a pseudo-random sequence, the method comprising:
selecting a first prime number p and a second prime number q, where q=2p+1;
selecting a key K;
generating a sequence of integers y(i), where $y(i)=K^i$ mod q, i=1, 2, . . . , n;
generating a sequence of integers z(i), where z(i)=y(i) if y(i)≦p, and z(i)=q-y(i) if y(i)>p;

generating a sequence of bits b(i) from the sequence of integers z(i); and
encrypting the message using the sequence of bits b(i).

11. The method of claim 10, wherein:
the message contains a sequence of bits P(i), where i=1, 2, . . . , n; and
the encrypted message comprises a sequence of bits C(i), where C(i)=P(i) XOR b(i).

12. The method of claim 11, further comprising:
decrypting the sequence of bits C(i) by performing the transformation P(i)=C(i) XOR b(i).

13. The method of claim 10, wherein:
the message contains a sequence of bits P(i), where i=1, 2, . . . , n;
F is a constant offset value; and
the encrypted message comprises a sequence of bits C(i), where C(i)=P(i) XOR b(i+F).

14. The method of claim 13, further comprising:
decrypting the sequence of bits C(i) by performing the transformation P(i)=C(i) XOR b(i+F).

15. The method of claim 13, wherein the constant offset value F is chosen such that p>n+F.

16. The method of claim 10, wherein:
the step of generating a sequence of bits b(i) from the sequence of integers z(i) is accomplished by selecting the least significant bit of each z(i) as each b(i).

17. The method of claim 10, further comprising selecting a bit position permutation based on the sequence of bits b(i), and wherein:
the message contains a message block of h bits having h bit positions; and
the step of encrypting the message comprises performing the selected bit position permutation on the message block.

18. The method of claim 10, further comprising selecting a bit pattern permutation based on the sequence of bits b(i), and wherein:
the message contains a message block of h bits, the h bits being arranged as a bit pattern; and
the step of encrypting the message comprises performing the selected bit pattern permutation on the message block.

19. The method of claim 10, further comprising:
selecting a bit position permutation based on the sequence of bits b(i); and
selecting a bit pattern permutation based on the sequence of bits b(i);
and wherein:
the message contains a message block of u bits having u bit positions;
the message block is divided into w sub-blocks, each containing h bits forming a bit pattern; and
the step of encrypting the message is performed in a plurality of transformations comprising:
applying a bit position permutation over the message block of u bits based on the selected bit position permutation; and
applying a bit pattern permutation over at least one of the w sub-blocks of h bits, based on the selected bit pattern permutation.

20. A method for encrypting a message of n bits using pseudo-random sequences, the method comprising:
selecting a first set of prime numbers p(j), where j=1, 2, . . . , m;

selecting a second set of prime numbers q(j), where q(j)=2p(j)+1;

selecting a set of keys K(j);

generating a set of sequences of integers y(i,j), where $y(i,j)=K(j)^i \mod q(j)$, where i=1, 2, ..., n;

generating a plurality of sequences of integers z(i,j), where z(i,j)=y(i,j) if y(i,j)≦p(j), and z(i,j)=q(j)−y(i,j) if y(i,j)>p(j); and encrypting the message using the sequences of integers z(i,j).

21. The method of claim 20, further comprising:

generating a plurality of sequences of bits b(i,j) from the sequences of integers z(i,j); and wherein:

the step of encrypting the message using the sequences of integers z(i,j) comprises encrypting the message using the sequences of bits b(i,j).

22. The method of claim 21, wherein:

the message contains a sequence of bits P(i), i=1, 2, ..., n; and the step of encrypting the message generates a sequence of bits C(i), where C(i)=P(i) XOR b(i,1) XOR b(i,2) ... XOR b(i,m).

23. The method of claim 22, further comprising:

decrypting the message to generate the sequence of bits P(i), where P(i)=C(i) XOR b(i,1) XOR b(i,2) ... XOR b(i,m).

24. The method of claim 21, further comprising selecting a set of constant offset values F(j), wherein:

the message contains a sequence of bits P(i), i=0, 1, ..., n; and the step of encrypting the message generates a sequence of bits C(i), where C(i)=P(i) XOR b(i+F(1),1) XOR b(i+F(2),2) ... XOR b(i+F(m),m).

25. The method of claim 24, further comprising:

decrypting the message to generate the sequence of bits P(i), where P(i)=C(i) XOR b(i+F(1),1) XOR b(i+F(2),2) ... XOR b(i+F(m),m).

26. The method of claim 24, wherein each constant offset value F(j) is chosen such that p(j)>n+F(j).

27. The method of claim 21, wherein:

the step of generating a plurality of sequences of bits b(i,j) from the sequences of integers z(i,j) is accomplished by selecting the least significant bit of each z(i,j) as each b(i,j).

28. The method of claim 20, further comprising:

selecting a plurality of bit pattern permutations based on the sequences of integers z(i,j);

and wherein:

the message contains a message block of u bits; and the step of encrypting the message is performed in a plurality of transformations, each transformation comprising:

dividing the message block into sub-blocks, each sub-block containing a plurality of bits forming a bit pattern; and applying one of the plurality of bit pattern permutations over at least one of the sub-blocks, based on the selected bit pattern permutation.

29. The method of claim 20, further comprising:

selecting a plurality of bit position permutations based on the sequences of integers z(i,j); and selecting a plurality of bit pattern permutations based on the sequences of integers z(i,j);

and wherein:

the message contains a message block of u bits having u bit positions; and the step of encrypting the message is performed in a plurality of transformations, each transformation comprising one of:

applying one of the plurality of bit position permutations over the message block of u bits based on the selected bit position permutation, and dividing the message block into sub-blocks, each sub-block containing a plurality of bits forming a bit pattern, and applying one of the plurality of bit pattern permutations over at least one of the sub-blocks, based on the selected bit pattern permutation.

* * * * *